Patented Nov. 2, 1948

2,452,977

UNITED STATES PATENT OFFICE 2,452,977

PRODUCTION OF CYCLIC ETHERS

Paul H. Williams, Berkeley, and Seaver A. Ballard, Oakland, Calif., assignors to Shell Development Company, San Francisco, Calif., a corporation of Delaware No Drawing. Application December 28, 1944, Serial No. 570,513

9 Claims. (Cl. 260—333)

This invention relates to a process for the production of cyclic compounds. More particularly, the invention provides a process for the reaction of an unsaturated alcohol with a compound containing an aldehyde group to produce a cyclic compound having an oxygen atom as a member of the ring.

The unsaturated alcohols which may be reacted with an aldehyde according to the process of the invention are preferably those which contain an unsaturated carbon atom which is directly attached by a single bond to a saturated carbon atom which in turn is directly linked to the carbinol carbon atom, and they may be represented by the formula

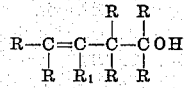

wherein $R_1$ and $R$ are members of the group consisting of the hydrogen atom and the hydrocarbon radicals. However, $R_1$ is preferably a hydrocarbon radical. The hydrocarbon radicals which $R$ and $R_1$ may represent may be any cyclic or acyclic, saturated or unsaturated radicals, but they are preferably of saturated character, i. e. containing no olefinic linkages between carbon atoms of aliphatic character. The non-olefinic radicals which $R$ and $R_1$ preferably represent may be alkyl, aryl, alkaryl, aralkyl, or cycloalkyl radicals such as, for example, methyl, ethyl, propyl, isopropyl, butyl, isobutyl, tertiary butyl, secondary butyl, amyl, isoamyl, hexyl, heptyl, octyl, benzyl, phenyl, tolyl, cyclopropyl, cyclobutyl, cyclopentyl, cyclohexyl, and the like and their homologues and analogues. Depending upon the members represented by the R's attached to the carbinol group, the unsaturated alcohol may be primary, secondary or tertiary. It has been found particularly convenient in carrying out the process of the invention to use an unsaturated alcohol which is secondary, especially one which may be represented by the formula

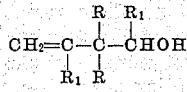

wherein the R's may be the same or different and represent the hydrogen atom or a hydrocarbon radical which is preferably non-olefinic, and wherein the ($R_1$)s may be the same or different and represent non-olefinic hydrocarbon radicals.

Examples of suitable unsaturated alcohols which may be reacted with aldehydes according to the process of the invention are 4-methyl-4-pentene-2-ol, 4-ethyl-4-pentene-2-ol, 4-methyl-4-hexene-2-ol, 5-propyl-5-hexene-3-ol, 5-phenyl-5-hexene-3-ol, 4-benzyl-4-octene-2-ol, 3,4-dimethyl-4-pentene-2-ol, 3,3,4-triethyl-4-hexene-2-ol, 4-pentene-2-ol, and the like and their homologues and analogues. These unsaturated alcohols may be prepared by any suitable means such as by dehydration of the corresponding glycol (e. g. 4-methyl-4-pentene-2-ol is prepared by the dehydration of diacetone glycol).

The aldehydes which are to be reacted with the unsaturated alcohols may be saturated or unsaturated, and may be represented by the formula

wherein $R_2$ is a member of the group consisting of the hydrogen atom, the hydrocarbon radicals and the halogen-substituted hydrocarbon radicals. Suitable hydrocarbon and halohydrocarbon radicals which $R_2$ may represent include the alkyl, alkenyl, aryl, alkaryl, aralkyl, alkenaryl, aralkenyl, cycloalkyl, cycloalkenyl radicals, and their corresponding halogen-substituted derivatives wherein one or more hydrogen atoms of the hydrocarbon radical have been replaced by one or more halogen atoms. Examples of hydrocarbon and halohydrocarbon radicals are methyl, ethyl, propyl, isopropyl, butyl, isobutyl, secondary butyl, tertiary butyl, amyl, isoamyl, hexyl, heptyl, octyl, vinyl, isopropenyl, isobutenyl, allyl, methallyl, crotyl, methylvinylcarbinyl, butadienyl, cyclopropyl, cyclohexyl, cyclopentadienyl, benzyl, phenyl, tolyl, 3,3,5-trimethylphenyl, chloromethyl, dichloromethyl, trichloromethyl, bromomethyl, chloroethyl, p-dichlorophenyl, chlorovinyl, chloroallyl, bromoallyl, and the like and their homologues and analogues. Representative examples of the aldehydes are formaldehyde, acetaldehyde, propionaldehyde, butyraldehyde, isobutyraldehyde, methylethylacetaldehyde, n-valeraldehyde, isovaleraldehyde, pivalic aldehyde, heptaldehyde, caprylic aldehyde, chloral, butyrchloral, acrolein, methacrolein, crotonaldehyde, vinyl acetaldehyde, tiglic aldehyde, beta-methylcrotonaldehyde, citronellal, citral, furfural, cinnamaldehyde, benzaldehyde, phenyl acetaldehyde, and the like and their homologues and analogues. It is to be understood that instead of or in addition to the aldehydes, there may be used substances capable of forming aldehydes under the conditions of the reaction, for example the acetals which may be represented by the formula $R_2$—CH($OR_1$)$_2$ or the hemiacetals which correspond to the formula

Examples of the acetals include dimethyl acetal, diethyl acetal, methyl ethyl acetal, diethyl chloroacetal, formal, chloral alcoholate, acrolein acetal, propionaldehyde diethyl acetal, and the like and their homologues and analogues. These acetals and hemiacetals are particularly effective if water is also present during the course of the reaction.

The cyclic compounds which are produced by reacting the unsaturated alcohol and aldehyde according to the process of the invention are compounds which contain an oxygen atom embraced in the cycle and have the following structures or structures isomeric therewith.

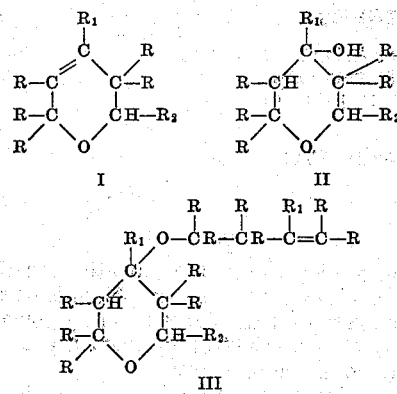

wherein $R_1$ is the hydrogen atom or a hydrocarbon radical which is preferably non-olefinic, $R_2$ is a member of the group consisting of the hydrogen atom, the hydrocarbon radicals and the halohydrocarbon radicals, and R is a member of the group consisting of the hydrogen atom and the hydrocarbon radicals which are preferably non-olefinic. The compounds represented by Formulae II and III may be further reacted under dehydration conditions to produce compounds corresponding to Formula I or having structures isomeric with that of Formula I. As indicated by Formula I, the double bond may be in the 3,4-position. However, the double bond may be in the 4,5-position or in the side chain forming a methylene group attached to the carbon atom in position number 4. The product in each case produced by the reaction of the unsaturated alcohol with the aldehyde or by the reaction of compounds corresponding to Formulae II and III under dehydration conditions may be a mixture of all three such isomers. For example, the reaction product of 4-methyl-4-pentene-2-ol with an aldehyde according to the process of the invention contains one or more compounds of the formulae

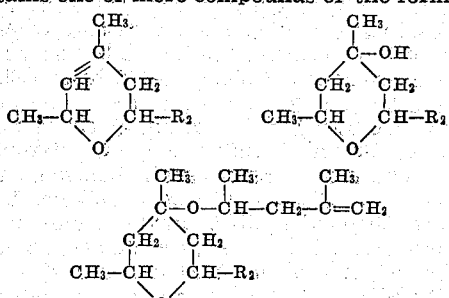

or of structures isomeric therewith. The constituency of $R_2$ depends upon the specific aldehyde reacted with the 4-methyl-4-pentene-2-ol.

The formation of the substituted dihydropyrans corresponding to Formula I, the substituted tetrahydropyranols corresponding to Formula II and the tetrahydropyranyl ethers corresponding to Formula III and/or of compounds isomeric with these structures may be brought about by treating a suitable unsaturated alcohol with an aldehyde in the presence of an acid-acting compound. Suitable acids and acid-acting compounds include the mineral acids, mineral acid-acting salts and other substances capable of acting as mineral acids under the conditions of operation and in contact with the reactants and water in the reaction mixture. For example, there may be employed the strong mineral acids such as $H_2SO_4$, $H_2S_2O_7$, $HPO_3$, $HCl$, $HBr$, $H_4P_2O_7$, $H_3PO_4$, $HNO_3$, $HClO_4$, and the like. Other suitable substances are compounds which form mineral acids with water such as $SO_2Cl_2$, $SOBr_2$, $SOCl_2$, $SO_2$, $N_2O_3$, $NOCl$, $POCl_3$, $PCl_3$, $PCl_5$ and the like and the mineral acid-acting salts such as $ZnSO_4$, $ZnCl_2$, $FeCl_3$, $AlCl_3$, $Fe_2(SO_4)_3$, $NaHSO_4$, $Al_2(SO_4)_3$, $NaH_2PO_4$, and the like. In addition, the reaction may take place in the presence of organic salts and compounds capable of acting as mineral acids under the conditions of operation such as ethyl sulphonic acid, benzene sulphonic acid and its homologues and analogues, p-toluenesulfonic acid, dialkyl and alkyl acid sulphates, alkylated phosphoric and sulphonic acids, halogenated organic acids, acids such as sulpho-acetic acid, acid halides and compounds such as aniline hydrochloride and the like. In some cases, the process may be executed employing the stronger organic acids, for example, oxalic acid.

The reaction may be effected at any temperature or pressure, and in the liquid or vapor phase. However, it has been discovered that the unsaturated alcohol will react with the aldehyde with ease to produce particularly high yields of the pyran compounds if the reaction mixture is maintained at lower temperatures, below reflux temperatures, and preferably below about 75° C., and at approximately atmospheric pressure. Particularly satisfactory results have been obtained, for example, when reacting an aldehyde with 4-methyl-4-pentene-2-ol by employing a temperature between about 0° C. and about 30° C. and preferably between about 5° C. and about 25° C.

If the reaction is carried out under dehydration conditions, e. g. with a strongly active catalyst and with rapid removal of water from the reaction zone, etc., the product will consist almost entirely of the substituted dihydropyran, with little, if any, of the intermediates present at the reaction end. However, under average reaction conditions, e. g. at room temperature and in the presence of a catalyst such as $H_2SO_4$, the unsaturated alcohol and the aldehyde may be reacted to produce substantial yields of the intermediates, such as the tetrahydropyranols, for example, which may then be separated from the reaction mixture. If desired, these intermediates may be further reacted under dehydration conditions, in the presence of a catalyst such as p-toluenesulfonic acid, to produce the substituted dihydropyrans. Conversely, the substituted dihydropyrans may be hydrated, e. g. in the presence of about 66% sulfuric acid, or by passing the dihydropyran in the vapor phase with steam over an acidic catalyst, etc., to produce the corresponding substituted tetrahydropyranols.

For the purpose of illustrating the invention and rendering the principles clear and understandable, the reaction is represented by the specific equation for the reaction of 4-methyl-4-pentene-2-ol with acetaldehyde in the presence of an acid-acting compound to form the corresponding dihydropyran.

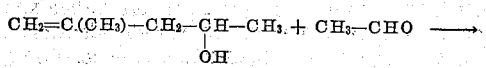

Instead of the 2,4,6-trimethyl-5,6-dihydro-1,2-pyran, there may be produced a compound or compounds having structures isomeric therewith, such as for example 2,4,6-trimethyl-3,4-dihydro-1,2-pyran or the compound having the double bond in the side chain forming a methylene group attached to the carbon atom in position number 4, 2,6-dimethyl-4-methylene-tetrahydropyran. The product may be a mixture of all three such isomers. The reaction of 4-methyl-4-pentene-2-ol and acetaldehyde under suitable conditions will also produce 2,4,6-trimethyltetrahydropyranol-4 and/or isomers thereof, as well as the pyran derivative having a structure corresponding to Formula III or an isomer thereof. These intermediates may be further reacted in the presence of an acid-acting compound, e. g. p-toluenesulfonic acid, preferably under dehydration conditions, to produce the 2,4,6-trimethyldihydropyran.

In the execution of the reaction of the unsaturated alcohol with the aldehyde, the unsaturated alcohol and aldehyde may be reacted in any proportion. It has been found effective to react the aldehyde and alcohol in a ratio of from 1:1 to about 3:1, but higher or lower ratios may be used if desired in any case. If desired, the reaction may be effected in the presence of solvents or diluents which are relatively inert to the reactants and/or products under the conditions of the reaction, for example, hydrocarbons such as benzene, toluene, and the like. These substances when in the liquid stage may serve as solvents or may be added to facilitate removal of the products formed. Aqueous solutions of the reactants or the acid-acting compounds may be used, although as a general rule, it is more desirable for greater yields of the dihydropyran to keep as little water as possible present during the reaction.

The unsaturated cyclic ethers prepared by the process of the invention are useful as diluents, modifying agents, and processing reagents in the textile industry, and the higher members particularly are valuable as solvents. They may also be used as reagents and/or additives in the formation of synthetic resins, plastics and synthetic rubbers, and the higher members may serve as insecticides, fungicides, parasiticides or as constituents of insecticidal, fungicidal and parasiticidal compositions, and so forth. In addition, they are valuable intermediates in the syntheses of valuable organic products; for example, the substituted dihydropyrans may be hydrogenated, if desired in the presence of a suitable hydrogenation catalyst such as Raney nickel to produce the corresponding substituted tetrahydropyran compounds. The substituted dihydropyrans may also be halogenated according to any suitable procedure to form substituted dihalodihydropyrans, for example those corresponding to the formula

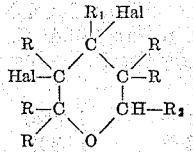

or they may be subjected to halohydrination, e. g. chlorohydrination under suitable conditions. The substituted dihydropyrans may be etherified, e. g. with alcohols, or they may be oxidized to produce the corresponding diols, and in fact they may undergo any reaction which a compound containing a tertiary olefinic linkage in general is capable of undergoing. These compounds which may be produced from the dihydropyrans may also serve a variety of useful purposes as solvents and modifying agents, and they may be used as reagents and/or additives in the formation of synthetic resins, plastics and synthetic rubbers, and as intermediates in organic syntheses.

The substituted tetrahydropyranols which are produced by the reaction of the unsaturated alcohol with an aldehyde according to the process of the invention are useful as solvents, modifying agents, and processing reagents, and in addition to being capable of further reaction in the presence of an acid-acting compound to produce the dihydropyrans, these tetrahydropyranols may be reacted with acids or acid anhydrides to form the corresponding esters. For example, 2,4,6-trimethyl-tetrahydropyranol-4 is reacted with acetic acid or acetic anhydride to form 2,4,6-trimethyl-tetrahydropyran-4-yl-acetate.

The following examples are introduced for the purpose of illustrating modes of executing the process of the invention.

*Example I*

About 352 parts by weight of 4-methyl-4-pentene-2-ol, containing about 1.8 parts by weight of concentrated sulfuric acid in solution was added dropwise to a flask containing about 310 parts by weight of acetaldehyde, while maintaining the reaction temperature at about 10° C. to about 12° C. The reaction mixture was then allowed to stand at room temperature, neutralized and distilled to obtain approximately a 40% yield of 2,4,6-trimethyl-5,6-dihydro-1,2-pyran, about a 51% yield of 2,4,6-trimethyl-tetrahydropyranol-4, and about a 9% yield of product of the formula $C_{14}H_{26}O_2$.

The 2,4,6-trimethyl-5,6-dihydro-1,2-pyran has a boiling range of 132° C. to 137° C. at 760 mm. and has the following physical properties:

$n_D^{20}$    1.4399
$d_4^{20}$    0.8620

The 2,4,6-trimethyl-tetrahydropyranol-4 boils at 188° C. to 189° C. at 763.9 mm. and has the following physical properties:

$n_D^{20}$    1.4528
$d_4^{20}$    0.9667

The product of empirical formula $C_{14}H_{26}O_2$ boils at 116° C. to 117° C. at 10 mm. and has the following physical properties:

$n_D^{20}$    1.4526
$d_4^{20}$    0.9042

*Example II*

Approximately 300 parts by weight of 4-methyl-4-pentene-2-ol containing about 1.8 parts by weight of concentrated sulfuric acid was added dropwise to about 318.4 parts by weight of benzaldehyde during one hour while maintaining the reaction mixture at about 10° C. to 12° C. The reaction mixture was then allowed to warm to room temperature for about 12 hours, neutralized and distilled to obtain approximately a 62% yield based on the alcohol of 2,4-dimethyl-6-phenyl-5,6-dihydro-1,2-pyran which has a boiling point of 107.3° C. to 107.6° C. at 5 mm. and has the following physical properties $n_D^{20}$    1.5284
$d_4^{20}$    0.9866

*Example III*

To about 140.2 parts by weight of crotonaldehyde, there was added dropwise approximately 200 parts by weight of 4-methyl-4-pentene-2-ol containing about 0.9 parts by weight of concentrated sulfuric acid while maintaining the temperature at approximately 10° C. to 12° C. On standing, the temperature of the reaction mixture gradually rose to 42° C. and then returned to room temperature where it was allowed to stand for about 12 hours. Upon neutralization and distillation, there was obtained about a 12.3% yield of 2,4-dimethyl-6-(1-propenyl)-5,6-dihydro-1,2-pyran, a yield of about 47.7% of 2,4-dimethyl-6-(1-propenyl)-tetrahydropyranol-4, and about a 40% yield of product of the empirical formula $C_{16}H_{28}O_2$. The 2,4-dimethyl-6-(1-propenyl)-5,6-dihydro-1,2-pyran boils at 182.0° C. to 184.2° C. at 766.5 mm. and has the following physical properties:

$n_D^{20}$    1.4643
$d_4^{20}$    0.8854

The 2,4-dimethyl-6-(1-propenyl)-tetrahydropyranol-4 boils at 122.8° C. to 123.0° C. at 20 mm. and has the following physical properties:

$n_D^{20} = 1.4730$, $d_4^{20} = 0.9690$

The product of empirical formula $C_{16}H_{28}O_2$ boils at 121° C. to 122° C. at 5 mm. and has the following physical properties: $n_D^{20} = 1.4675$, $d_4^{20} = 0.9341$.

About 30 parts by weight of the 2,4-dimethyl-6-(1-propenyl)-tetrahydropyranol-4 was treated with about 0.5 part by weight of p-toluene sulfonic acid at reflux temperature, resulting in dehydration to the 2,4-dimethyl-6-(1-propenyl)-5,6-dihydro-1,2-pyran.

*Example IV*

The reaction of about 200 parts by weight of 4-methyl-4-pentene-2-ol with about 192.2 parts by weight of freshly distilled furfural in the presence of about 0.9 part by weight of concentrated sulfuric acid was carried out in the usual manner. After neutralization and distillation, there was obtained about 49.8 parts by weight of 2,4-dimethyl-6-(alpha-furyl)-5,6-dihydro-1,2-pyran boiling at 83.8° C. to 84.4° C. at 5 mm., and about 39.6 parts by weight of 2,4-dimethyl-6-(alpha-furyl)-tetrahydropyranol-4 boiling at 102.9° C. to 105.8° C. at 1.5 mm.

*Example V*

To about 147.4 parts by weight of chloral there was added in the usual manner about 77 parts by weight of 99.2% 4-methyl-4-pentene-2-ol containing about 1.8 parts by weight of concentrated sulfuric acid. The reaction mixture solidified on the addition of the alcohol, and there was obtained a yield of about 78% based on the alcohol of the product of the empirical formula $C_8H_{13}O_2Cl_3$ melting at 69.5° C. to 70° C.

*Example VI*

A mixture consisting of about 154.7 parts by weight of acetaldehyde and about 244.2 parts by weight of 4-methyl-4-pentene-2-ol was passed through an electrically heated laboratory furnace over phosphoric acid absorbed on kieselguhr at a rate of about 2.1 parts by weight per minute and at a temperature of about 80° C. to about 90° C. Approximately 80% of the alcohol was recovered unchanged. The conversions of alcohol to 2,4,6-trimethyl-5,6-dihydro-1,2-pyran, to 2,4,6-trimethyl-tetrahydropyranol-4 and to the product of the formula $C_{14}H_{26}O_2$ were 7.0%, 6.4% and 4.3%, respectively.

*Example VII*

About 44 parts by weight of acetaldehyde and about 100 parts by weight of 4-methyl-4-pentene-2-ol were cooled to about 10° C. and approximately 2 parts by weight of anhydrous ferric chloride were added. Cooling was maintained until no further heating effect was noticed, and the reaction mixture was allowed to stand at room temperature. After neutralization with strong sodium hydroxide, the mixture was distilled and there was recovered about 30.0 parts by weight of 2,4,6-trimethyl-tetrahydropyranol-4 corresponding to a yield of about 66% based on the alcohol converted, and about 14.4 parts by weight of a higher boiling material. About 68 parts by weight of alcohol was recovered unchanged.

*Example VIII*

About 1 part by weight of anhydrous hydrochloric acid was mixed with about 190 parts by weight of 4-methyl-4-pentene-2-ol and the mixture added dropwise over a period of about one and one-half hours to about 88 parts by weight of acetaldehyde, cooling to about 100° C. to about 15° C. The reaction mixture stood at room temperature for about 36 hours, and was then neutralized and distilled to obtain 2,4,6-trimethyl-5,6-dihydro-1,2-pyran, 2,4,6-trimethyl-tetrahydropyranol-4 and the product having the empirical formula $C_{14}H_{26}O_2$.

*Example IX*

A mixture of about 1.8 parts by weight of concentrated sulfuric acid with about 200 parts by weight of 4-methyl-4-pentene-2-ol was added dropwise to about 88 parts by weight of acetaldehyde while cooling to about 15° C. in an ice bath. The mixture was allowed to stand for approximately 16 hours, neutralized with a solution of about 16 parts by weight of sodium carbonate in about 130 parts by weight of water, and steam distilled. There was about an 87.3% conversion of alcohol to produce a yield of about 25.2% of 2,4,6-trimethyl-5,6-dihydro-1,2-pyran, about 48.4% of 2,4,6-trimethyl-tetrahydropyranol-4 and about 23.2% of product having the empirical formula $C_{14}H_{26}O_2$.

*Example X*

About 716 grams of 2,4,6-trimethyl-5,6-dihydro-1,2-pyran, about 600 ml. of methanol, and about 25 grams of Raney nickel were placed in a 2300 ml. hydrogenation vessel and heated and shaken for approximately 15 hours at a maximum temperature and pressure of 150° C. and 1400 pounds per square inch. To insure complete reaction, the product was treated with fresh catalyst and heated and shaken with hydrogen at 150° C. and 1350 pounds per square inch for 6 hours. There was obtained 2,4,6-trimethyl-tetrahydropyran boiling at 129.4° C. to 136.4° C. at 760 mm. and having the following physical properties:

$n_D^{20}$    1.4220
$d_4^{20}$    0.8389

*Example XI*

To about 126 grams of 2,4,6-trimethyl-5,6-dihydro-1,2-pyran was added about 225 ml. of 66% sulfuric acid, maintaining the temperature at about 10° C. to 20° C. The temperature was allowed to rise to 22° C. and about 400 grams of ice was added and the mixture allowed to stand over night. After neutralization and distillation there was obtained approximately 98 grams of 2,4,6-trimethyl-tetrahydropyranol-4.

Acetylation of about 35 parts by weight of the hydrated ether with about 51 parts by weight of acetic anhydride yielded approximately 35 parts by weight of 2,4,6-trimethyl-tetrahydropyranyl acetate. The acetate boils at 86° C. to 88° C. at 16 mm.

*Example XII*

A solution of about 79 parts by weight of potassium permanganate in about 4000 parts by weight of water was added dropwise to a stirred mixture of about 53 parts by weight of 2,4,6-trimethyl-5,6-dihydro-1,2-pyran and about 20 parts by weight of sodium hydroxide in about 200 parts by weight of water, maintaining the reaction temperature at about 8° C. to 10° C. After destroying the excess permanganate with sodium thiosulfate, concentrating the solution and extracting with ether, there was obtained about 20 parts by weight of 2,4,6-trimethyl-tetrahydropyran-3,4-diol melting at 79.7° C. to 80° C., and boiling at 235° C. to 240° C. at 760 mm.

*Example XIII*

A mixture of about 90 parts by weight of 4-methyl-4-pentene-2-ol with about 1 part by weight of p-toluenesulfonic acid was added dropwise over a period of about one and three-fourths hours to about 56.1 parts by weight of acrolein, cooling to about 8° C. to about 10° C. The mixture stood at room temperature for about 22 hours and was then neutralized and distilled to produce about a 49.5% yield based on the alcohol of 2,4-dimethyl-6-vinyl-tetrahydropyranol-4, boiling at 77° C. to 78° C. at 5 mm., and about a 27.2% yield of product of formula $C_{15}H_{26}O_2$ which had a boiling range of 68° C. to 70° C. at about 1 mm.

A portion of the 2,4-dimethyl-6-vinyl-tetrahydropyranol-4 was dehydrated with p-toluenesulfonic acid and there was obtained 2,4-dimethyl-6-vinyl-5,6-dihydro-1,2-pyran which had a boiling range of 157° C. to 160° C. at 760 mm.

*Example XIV*

A mixture of about 100 parts by weight of 4-methyl-4-pentene-2-ol and about 1.8 parts by weight of concentrated sulfuric acid was added dropwise to about 118.2 parts by weight of diethyl acetal simultaneously with about 18 parts by weight of water which was added separately, and the solution was maintained at about 8° C. to 10° C. The homogeneous solution then stood at room temperature for about 16 hours and neutralized and distilled to produce about a 31% yield of 2,4,6-trimethyl-5,6-dihydro-1,2-pyran, about a 51.5% yield of 2,4,6-trimethyltetrahydropyranol-4 and about a 14% yield of the product of empirical formula $C_{14}H_{26}O_2$.

*Example XV*

To about 305 parts by weight of diethyl chloroacetal was added about 36 parts by weight of water and about 172 parts by weight of 4-methyl-4-pentene-2-ol containing about 1.8 parts by weight of concentrated sulfuric acid. The mixture was maintained at about 10° C. during the addition period of about 30 minutes. The mixture was then heated for approximately 5 to 6 hours at about 50° C. to 60° C. during which time the mixture became homogeneous. The solution was neutralized and distilled, and there was obtained about a 64.7% yield of 2,4-dimethyl-6-chloromethyl-5,6-dihydro-1,2-pyran and about a 26% yield of 2,4-dimethyl-6-chloromethyl-tetrahydropyranol-4.

It is to be understood that the pyran compounds may be produced by using instead of the aldehyde and the unsaturated alcohol, reactants containing said aldehyde and unsaturated alcohol and/or reactants capable of producing the aldehyde and the unsaturated alcohol of desired formula under the conditions of the reaction. For example, during the course of the dehydration of diacetone glycol to methylpentadiene in the presence of a dehydration catalyst, there is formed by partial dehydration of the glycol 4-methyl-4-pentene-2-ol in addition to acetaldehyde which is produced by cleavage of the glycol. The acetaldehyde and 4-methyl-4-pentene-2-ol react to form the corresponding pyran compounds, particularly 2,4,6-trimethyl-5,6-dihydro-1,2-pyran, present in the reaction products formed by dehydration of diacetone glycol. Similarly, when an olefin and an aldehyde are reacted under suitable conditions, an unsaturated alcohol may be formed which will react with the excess aldehyde present to form pyran compounds.

We claim as our invention:

1. 2,4-dimethyl-6-(1-propenyl)-5,6-dihydro-1,2-pyran, a compound of the formula

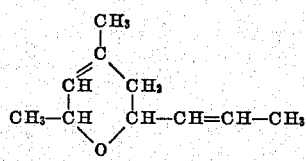

2. 2,4-dimethyl-6-(1-propenyl)-tetrahydropyran-4-ol, a compound of the formula

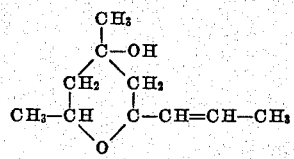

3. 2,4,6-trimethyl-5,6-dihydro-1,2-pyran, a compound having the formula

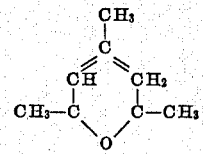

4. A 2,4-dimethyl-5,6-dihydro-1,2-pyran of the general formula

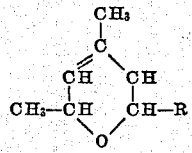

wherein R is a member of the group consisting of a hydrogen atom, a hydrocarbon radical and a halogen-substituted hydrocarbon radical.

5. A 2,4-dimethyl-tetrahydropyran-4-ol of the general formula

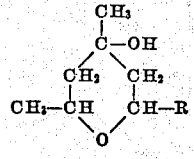

wherein R is a member of the group consisting of a hydrogen atom, a hydrocarbon radical and a halogen-substituted hydrocarbon radical.

6. A 2,4-dialkyl-hydropyran derivative which is a member of the group consisting of the 5,6-dihydro-1,2-pyrans in which the carbon atom in the 6-position of the ring is linked to a member of the group consisting of a hydrogen atom, a hydrocarbon radical and a halogen-substituted hydrocarbon radical, and the tetrahydropyran-4-ols in which the carbon atom in the 6-position of the ring is linked to a member of the group consisting of a hydrogen atom, a hydrocarbon radical and the halogen-substituted hydrocarbon radical.

7. A method of preparing 2,4-dimethyl-6-(1-propenyl)-5,6-dihydro-1,2-pyran and 2,4-dimethyl-6-(1-propenyl)-tetrahydropyran-4-ol which comprises, reacting 4-methyl-4-penten-2-ol with crotonaldehyde in the presence of sulfuric acid at a temperature below about 75° C.

8. A method of preparing 2,4,6-trimethyl-5,6-dihydro-1,2-pyran which comprises reacting 4-methyl-4-penten-2-ol with acetaldehyde in the presence of sulfuric acid at a temperature below about 75° C.

9. A process for the production of a 2,4-dialkyl-hydropyran derivative which is a member of the group consisting of the 5,6-dihydro-1,2-pyrans in which the carbon atom in the 6-position of the ring is linked to a member of the group consisting of a hydrogen atom, a hydrocarbon radical and a halogen-substituted hydrocarbon radical, and the tetrahydropyran-4-ols in which the carbon atom in the 6-position of the ring is linked to a member of the group consisting of a hydrogen atom, a hydrocarbon radical and a halogen-substituted hydrocarbon radical, which process comprises, reacting 4-methyl-4-penten-2-ol with an aldehyde in the presence of an acid-acting condensation catalyst at a temperature below about 75° C.

PAUL H. WILLIAMS.
SEAVER A. BALLARD.

REFERENCES CITED

The following references are of record in the file of this patent:

UNITED STATES PATENTS

| Number | Name | Date |
|---|---|---|
| 2,078,534 | Groll et al. | Apr. 27, 1937 |

OTHER REFERENCES

Kyriakides: Jour. Am. Chem. Soc., vol. 36 (1914), pp. 993-5, 998.